(No Model.)
D. B. ROCK.
ANIMAL TRAP.
No. 418,228. Patented Dec. 31, 1889.
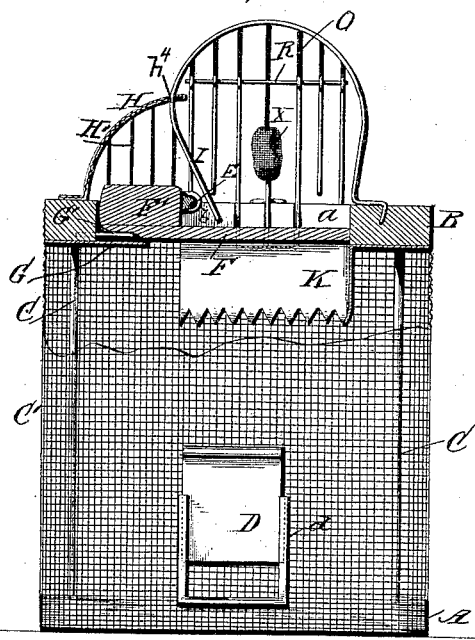
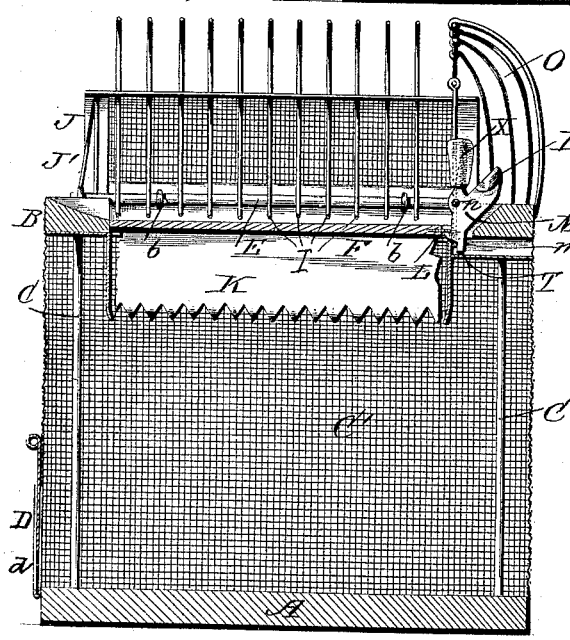
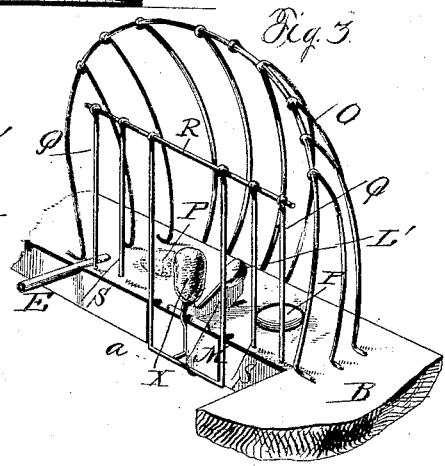
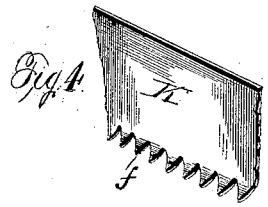
Witnesses
Chas. J. Williamson
E. H. Bond
Inventor
Daniel B. Rock,
per Chas. H. Fowler
Attorney.

UNITED STATES PATENT OFFICE.

DANIEL B. ROCK, OF FAIRFIELD, PENNSYLVANIA.

ANIMAL-TRAP.

SPECIFICATION forming part of Letters Patent No. 418,228, dated December 31, 1889.

Application filed August 2, 1889. Serial No. 319,545. (No model.)

*To all whom it may concern:*

Be it known that I, DANIEL B. ROCK, a citizen of the United States, residing at Fairfield, in the county of Adams and State of Pennsylvania, have invented certain new and useful Improvements in Rat-Traps; and I do hereby declare that the following is a full, clear, and exact description of the same, reference being had to the annexed drawings, making a part of this specification, and to the letters of reference marked thereon.

This invention relates to certain new and useful improvements in animal-traps; and it has for its object to provide a device of this character which shall be simple and cheap, yet very efficient in operation, providing for the ready catching of the animal, and providing against his escape after he has once gotten into the trap.

The invention in the present instance resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a side elevation of an animal-trap constructed in accordance with my invention. Fig. 2 is a vertical section through the same. Fig. 3 is a perspective detail of the bait and catching device. Fig. 4 is a perspective detail, which will be hereinafter more particularly referred to by reference-letters.

Like parts are indicated by like letters of reference throughout the several views.

Referring now to the details of the drawings by letter, A designates a suitable base or bottom of the trap, preferably of wood, and B a like top, the two being connected and stayed by means of the stay rods or bolts C, one near each corner.

C' is the covering connecting the top and bottom. It is of any suitable reticulated material, and is secured to the outer edges of the top and bottom in any suitable manner.

D is a door sliding in suitable guides $d$, for the purpose of removing the animals from the trap. The top is provided with an opening $a$, longitudinally along one side of which extends the shaft or rod E, held in any suitable manner, and on this shaft the trap door or platform is designed to swing as a pivot. The platform or door F is arranged a slight distance below the top face of the top of the trap, and to one side of the shaft E has a weighted portion F', in the inner side edge of which are secured suitable eyes $b$, which embrace the shaft E and serve as a connection between the shaft and platform, allowing the latter to swing on the shaft. The space beneath this weighted portion of the platform is covered by means of a zinc plate G, which is attached to the under side of the top, as shown in Fig. 1, and G' is a stay rod or pin extending from the top above this zinc plate and arranged to receive the said weighted portion as the platform assumes the position in which it is shown in Fig. 1. This zinc plate prevents the animals caught in the trap from getting out at the space behind the platform or from getting at the same to gnaw it. Over this weighted portion of the platform there are arranged the netting H at the outer side, the bars H' at the ends, and the inner side is closed by means of the wires I, the ends of which are passed through the inner edge of the netting, as at $h^4$, and are then curved upward and have their other ends secured to the top at the other side of the opening $a$ therein. This forms a covered passage for the animal from the end J to the bait end of the trap. The end J is preferably slightly downwardly inclined, as shown at J', to lead the animals onto the platform. The front side and two ends of the opening in the top are surrounded within the trap by means of sheet-metal strips K, the lower edges of which are toothed, as shown, the teeth curving inward toward each other, as shown more clearly in Fig. 4 at $f$, so that if the animals in the trap attempt to escape through the opening they will be caught by these teeth and maimed if not killed.

The platform is normally held up in the position shown in Fig. 1 in the following manner: To the edge of the platform opposite its pivoted edge there is secured a plate L, against the under side of which the catch is designed to engage. This catch M is pivoted to the top on the transverse pivot $n$, and at its lower end is formed with a horizontal portion or lip m, which engages the under side of the plate L, as shown in Fig. 2, and holds the platform up. The catch is formed with a weighted portion L', which serves to normally hold the catch in this position. The catch is also formed with an upwardly-extending portion to receive the bait, the bait being represented in the drawings by the letter X.

In practice the animal enters on the platform, and while still standing on the platform nibbles the bait on the catch. This movement pulls the upper end of the catch forward and relieves its lower end from engagement with the plate on the platform, and, there being nothing to support the platform and the weight of the animal, the platform tilts, and the animal is thrown down into the trap. As soon as the platform is relieved of the weight of the animal it assumes its normal position and sets the trap, the under side of the horizontal portion of the catch being upwardly inclined for this purpose.

It has been found that some animals will not touch cheese or meat and substances of that character, but will greedily eat meal and the like. To provide for the taste of such animals I have made provisions for the baiting of the trap with both or either of such kinds of bait. The catch above described is designed to receive cheese, meat, and the like.

For the reception of the other kind of bait I have provided the following mechanism: Within the housing or cage formed by the wires O, I have formed in the top of the trap depressions P, into which the meal or other like bait may be placed. Supported by suitable upright rods Q is the cross-bar R, free to rock in suitable bearings in the upper ends of said uprights. On this cross-bar are secured the depending wires S, which extend downward in front of the depressions in the top, so that as the animal goes to eat the bait in the depressions his nose will strike the wire. This causes the cross-bar to rock. Secured to this cross-bar so as to rock therewith is a depending bail T, which extends beneath the horizontal portion of the catch, so that as the cross-bar is rocked by engagement of the animal with the wires S the bail will move the lower end of the catch backward and release the catch from its engagement with the plate L on the platform and allow the platform to tilt and throw the animal into the trap.

What I claim as new is—

1. The combination, with the trap proper and the pivoted platform, of the pivoted catch for engaging the same, and the swinging bail engaging the catch and supported at its upper end by a rocking shaft, substantially as described.

2. The combination, with the trap, the pivoted platform, and the pivoted catch, of the depending wires hanging loosely in front of the bait-receptacles, and the bail operated by movement of said wires and engaging the catch, as set forth.

3. The combination, with the trap and the pivoted platform, of the pivoted catch, the rocking cross-bar above the bait-holder, the depending wires thereon, and the bail on said cross-bar engaging the catch, substantially as and for the purpose specified.

4. The combination, with the trap, the pivoted platform, and the pivoted catch, of the rocking cross-bar, the depending wires on said cross-bar, and the bail independent of the wires and attached to the cross-bar with its lower portion engaging the catch, substantially as shown and described.

In testimony that I claim the above I have hereunto subscribed my name in the presence of two witnesses.

DANIEL B. ROCK.

Witnesses:
W. H. McCREARY,
WM. H. LOW.